(12) United States Patent
Prinzinger et al.

(10) Patent No.: US 11,065,729 B2
(45) Date of Patent: Jul. 20, 2021

(54) INSERTION DEVICE AND METHOD FOR INSERTING A CIRCULAR BLANK RING INTO AN OUTER RING OF A CIRCULAR BLANK

(71) Applicant: Schuler Pressen GmbH, Göppingen (DE)

(72) Inventors: Helmut Prinzinger, Böhmenkirch (DE); Simon Kneer, Eislingen (DE)

(73) Assignee: Schuler Pressen GmbH, Göppingen (DE)

( * ) Notice: Subject to any disclaimer, the term of this patent is extended or adjusted under 35 U.S.C. 154(b) by 55 days.

(21) Appl. No.: 16/084,868

(22) PCT Filed: Mar. 1, 2017

(86) PCT No.: PCT/EP2017/054815
§ 371 (c)(1),
(2) Date: Sep. 13, 2018

(87) PCT Pub. No.: WO2017/157667
PCT Pub. Date: Sep. 21, 2017

(65) Prior Publication Data
US 2019/0054581 A1    Feb. 21, 2019

(30) Foreign Application Priority Data
Mar. 15, 2016 (DE) .......................... 102016204209.2

(51) Int. Cl.
*B23P 19/08* (2006.01)
*B21K 25/00* (2006.01)
(Continued)

(52) U.S. Cl.
CPC ............ *B23P 19/084* (2013.01); *B21K 25/00* (2013.01); *B23P 19/04* (2013.01); *B29C 65/56* (2013.01);
(Continued)

(58) Field of Classification Search
CPC ....... B23P 11/00; B23P 11/022; B23P 19/084; B23P 19/12; B23P 19/10; B23P 19/088;
(Continued)

(56) References Cited

U.S. PATENT DOCUMENTS 3,708,054 A    1/1973  Gilev et al.
4,184,827 A *  1/1980  von Herrmann ..... B30B 11/005
                                                250/237 G
(Continued)

FOREIGN PATENT DOCUMENTS

CN    101797624 A    8/2010
CN    102307684 A    1/2012
(Continued)

OTHER PUBLICATIONS

Engineering Toolbox, Double Acting Pneumatic Cylinder, Mar. 8, 2013, p. 2 (Year: 2013).*
(Continued)

*Primary Examiner* — Tyrone V Hall, Jr.
*Assistant Examiner* — Robert F Neibaur
(74) *Attorney, Agent, or Firm* — Fitch, Even, Tabin & Flannery LLP

(57) ABSTRACT

An outer ring (29) is first transported to an insertion point (E) in the feed device (34). At the same time, a circular blank ring (30) is brought into a starting position (P) in the feed device. The circular blank ring (29) is first aligned coaxially with respect to an axis (A) using a centering body (61). The circular blank ring moves solely radially with respect to the axis (A). The circular blank ring (30) is then inserted into the hole of the outer ring (29). During this movement, the circular blank ring is aligned coaxially with respect to the axis (A) preferably using a centering channel (54). The circular blank ring (30) carries out a superimposed move-
(Continued)

ment in the axial direction (V) and in the radial direction radially with respect to the axis (A).

16 Claims, 6 Drawing Sheets

(51) Int. Cl.
    *B29C 65/64*       (2006.01)
    *B44B 5/00*        (2006.01)
    *B29C 65/78*       (2006.01)
    *B29C 65/80*       (2006.01)
    *B29C 65/00*       (2006.01)
    *B44B 5/02*        (2006.01)
    *B23P 19/04*       (2006.01)
    *B29C 65/56*       (2006.01)

(52) U.S. Cl.
    CPC .......... *B29C 65/64* (2013.01); *B29C 65/7802* (2013.01); *B29C 65/7811* (2013.01); *B29C 65/7882* (2013.01); *B29C 65/80* (2013.01); *B29C 66/1142* (2013.01); *B29C 66/742* (2013.01); *B29C 66/8322* (2013.01); *B44B 5/0052* (2013.01); *B44B 5/024* (2013.01)

(58) Field of Classification Search
    CPC .. B23Q 1/00; B23Q 3/00; B21K 25/00; B44B 5/0052; B44B 5/024; B29C 65/56; B29C 65/565; B29C 65/64; B29C 65/7802; B29C 65/7811; B29C 65/80; B29C 66/5221; B29C 66/5241; B29C 66/742; B29C 66/8322; Y10T 29/53678; Y10T 29/53657; Y10T 29/53609
    USPC .. 29/235, 238, 239, 243.5, 243.523, 243.53, 29/244
    See application file for complete search history.

(56) References Cited

U.S. PATENT DOCUMENTS

| | | | |
|---|---|---|---|
| 7,600,306 B2 * | 10/2009 | Lawson | B23P 19/04 |
| | | | 29/221.5 |
| 7,600,606 B2 | 10/2009 | Brittingham | |
| 8,459,085 B2 | 6/2013 | Muschalik et al. | |
| 8,769,788 B2 * | 7/2014 | Faitel | B23P 11/00 |
| | | | 29/243.53 |
| 9,868,317 B2 | 1/2018 | Kneer et al. | |
| 2011/0268908 A1 | 11/2011 | Kim et al. | |
| 2013/0160516 A1 | 6/2013 | Karasawa et al. | |
| 2015/0201721 A1 | 7/2015 | Meyer-Steffens et al. | |
| 2016/0129725 A1 * | 5/2016 | Kneer | B44B 5/024 |
| | | | 29/429 |

FOREIGN PATENT DOCUMENTS

| | | | | |
|---|---|---|---|---|
| CN | 103170842 A | 6/2013 | | |
| CN | 204123045 U | 1/2015 | | |
| CN | 104369146 A | 2/2015 | | |
| CN | 204487491 U | 7/2015 | | |
| CN | 205057444 U | 3/2016 | | |
| DE | 10057000 A1 | 5/2001 | | |
| DE | 102010013148 A1 | 9/2011 | | |
| DE | 102012014958 A1 | 2/2014 | | |
| DE | 102013106375 A1 | 12/2014 | | |
| EP | 0320731 A2 * | 6/1989 | ............ | B44B 5/024 |
| EP | 0320731 A2 | 6/1989 | | |
| EP | 2511022 A2 | 10/2012 | | |
| ES | 2294882 A1 | 4/2008 | | |
| JP | S63-199927 A | 8/1988 | | |
| JP | 2001-205372 A | 7/2001 | | |
| JP | 2005-238397 A | 9/2005 | | |
| JP | 2016-526494 A | 9/2016 | | |
| KR | 0144703 B1 | 8/1998 | | |
| WO | 2014/202562 A1 | 12/2014 | | |
| WO | WO-2014202562 A1 * | 12/2014 | ........... | B44B 5/0057 |

OTHER PUBLICATIONS

Catalin Chivu, Simulation of Double Acting Pneumatic Cylinder Control, Nov. 2014, Universitatea Transivania Brasov (Year: 2014).*
Chinese First Office Action and Search Report dated Oct. 28, 2019, in corresponding Chinese Application No. 201780017520.5, with English translation (30 pages).
International Search Report dated May 26, 2017, for corresponding PCT Application No. PCT/EP2017/054815 (11 pgs.).
German Office Action dated Feb. 9, 2017, for corresponding DE Application No. 102016204209.2, with Machine English Translation (9 pgs.).
Japanese Office Action dated Jun. 10, 2020, in corresponding Japanese Application No. 2018-548376, with English translation (6 pages).
Chinese Second Office Action dated Jul. 10, 2020, in corresponding Chinese Application No. 201780017520.5, with English translation (21 pages).
Ruan Li-Zhong, Handbook of Common Electrical Control Circuits, Fujian Science and Technology Publishing House, Jan. 2009, p. 33 (3 pages).
Li Hai-Jin, Chen Gui-Qing, Hydraulic and Pneumatic Technology, Beijing Aeronautics and Astronautics University Press, Jul. 2015, p. 172 (3 pages).
Japanese Decision to Grant dated Nov. 4, 2020, in corresponding Japanese Application No. 2018-548376, with English translation (3 pages).
Chinese Notification of Grant issued Jun. 8, 2021, in Chinese Application No. 201780017520.5, with English translation (8 pages).

* cited by examiner

INSERTION DEVICE AND METHOD FOR INSERTING A CIRCULAR BLANK RING INTO AN OUTER RING OF A CIRCULAR BLANK

CROSS REFERENCE TO RELATED APPLICATIONS

This patent application is the national phase of PCT/EP2017/054815, filed Mar. 1, 2017, which claims the benefit of German Patent Application No. 102016204209.2, filed Mar. 15, 2016.

TECHNICAL FIELD

The invention relates to an insertion device and to a method for inserting a circular blank ring into an outer ring of a circular blank.

BACKGROUND

A circular blank comprising multiple circular blank parts is known from DE 10 2010 013148 A1. The circular blank is composed of a circular blank core, an outer ring and a circular blank ring, which is arranged between the circular blank core and the outer ring. The circular blank core and the outer ring are made of a metallic material. The circular blank ring is essentially made of plastic material, for example a polymer.

When a circular blank ring made of plastic material is joined to another circular blank part made of metal, the circular blank ring may become deformed and damaged. After the center hole has been punched, the outer ring has a burr. During joining, it is not known on which side of the outer ring the burr is located. In particular such a burr can damage a circular blank ring made of a softer material, in particular plastic material, during assembly with the outer ring.

A device and a method for inserting a non-round circular blank core into a circular blank ring is known from WO 2014/202562. The circular blank core is positioned axially adjacent to the hole of the circular blank ring and inserted using a pressing-in unit, providing a pressing-in force. The circular blank core and the circular blank ring have a non-round shape. If the non-round contours are not exactly aligned with one another, the generation of the pressing-in force causes a relative rotation between the circular blank core and the circular blank ring until the contours are aligned, and pressing in is possible. Pressing in can take place vertically from above or vertically from below.

Proceeding from the known prior art, it can be considered to be an object of the invention to improve the insertion of a circular blank ring made of plastic material into an outer ring of a circular blank, and to avoid damage to the circular blank ring.

SUMMARY

The insertion device and the method are configured to insert a circular blank ring into an outer ring. The circular blank ring and the outer ring form part of a multi-piece circular blank, for example, which can, in particular, be composed of a circular blank core, the circular blank ring and the outer ring. The outer ring is made of metal or a metallic alloy. The circular blank core is likewise made of metal or a metallic alloy and can be made of the same material as or a material that is different from that of the outer ring. The circular blank ring is made of a material that is softer than the material of the outer ring. The circular blank ring is preferably made of plastic material, or is at least predominantly made of plastic material.

The insertion device comprises a pusher arranged coaxially with respect to an axis. The pusher has a pusher surface on the end face thereof for acting upon or moving the circular blank ring relative to the outer ring. A pusher drive is present so as to move the pusher along the axis. The axis preferably extends in a vertical direction or at an acute angle with respect to the vertical.

Additionally, a centering body, which is arranged coaxially with respect to the axis, forms part of the insertion device. The centering body has a free end, which is assigned to the pusher surface or an insertion point. The centering body can include a chamfer or a tapering and, for example, conical section at the free end.

The centering body can be moved along the axis to the insertion point by way of a centering drive. At the insertion point, the centering body can be caused to engage with an outer ring present there. A centering drive is used to move the centering body along the axis. The engagement of the centering body with the outer ring causes the outer ring to be aligned coaxially with respect to the axis. The movement of the centering body to the insertion point preferably takes place vertically downwardly.

A control unit is configured to activate the centering drive for the centering body and the pusher drive for the pusher. The activation of the centering drive causes the outer ring to become aligned coaxially with respect to the axis. Upon activation of the pusher drive, the pusher acts with the pusher surface upon the circular blank ring and moves the circular blank ring along the axis to the insertion point. At the insertion point, the circular blank ring is inserted into the outer ring.

Prior to the insertion of the circular blank ring, the outer ring is aligned coaxially with respect to the axis. This clearly predefines the position thereof. The circular blank ring can thus be moved coaxially with respect to the axis A and inserted into the outer ring with minimal frictional contact therewith. After punching of the hole, the outer ring has a burr on one side. This burr may be present on the side from which the circular blank ring is inserted and may result in damage to the softer circular blank ring if radial overlap exists between the circular blank ring and the outer ring. Damage to the circular blank ring during insertion can be avoided by avoiding such radial overlap during insertion.

The movement of the circular blank ring to the insertion point or toward the outer ring is preferably oriented vertically upwardly.

The control unit is preferably configured to activate the centering drive and the pusher drive in such a chronologically coordinated manner that the centering body engages in the outer ring before the pusher brings the circular blank ring in contact with the outer ring. The centering body thus engages in the outer ring as long as the circular blank ring and the outer ring do not yet make contact yet and have a distance in the axial direction, parallel to the axis. This ensures that the alignment of the outer ring coaxially with respect to the axis is completed before any contact takes place between the circular blank ring and the outer ring.

It is furthermore advantageous when the control unit is configured to activate the centering drive and the pusher drive in such a chronologically coordinated manner that the centering body still rests against the outer ring after the circular blank ring has made contact with the outer ring. It is possible for the centering body to rest against the outer ring until the insertion of the circular blank ring has been completed. While the pusher inserts the circular blank ring into the outer ring, the centering body is in contact with the circular blank ring, at least during a certain time period or during the entire insertion process. This reliably preserves the coaxial alignment with respect to the axis. Preferably, the centering body acts upon the outer ring until the circular blank ring moved by the pusher pushes the centering body away from the outer ring, for example into a starting position or an idle position of the centering body.

It is also possible for the control unit to be configured to activate the centering drive and the pusher drive in such a chronologically coordinated manner that the centering body is located away from the outer ring before the pusher brings the circular blank ring in contact with the outer ring. It is furthermore possible to move the centering body away from the outer ring as soon as the circular blank ring makes contact with the outer ring, so that contact only still exists between the centering body and the outer ring at the start of the joining process. As soon as the circular blank ring partially engages in the outer ring, a movement of the outer ring radially with respect to the axis can be enabled.

After the contact is made between the centering body and the outer ring, the force with which the centering body presses on the outer ring is determined preferably solely by the weight of the centering body. Preferably, the state in which the centering body rests on the outer ring solely by the weight thereof is set by the activation of the centering drive before the insertion of the circular blank ring has been completed or before the circular blank ring makes contact with the outer ring.

In one exemplary embodiment, the centering drive comprises a pneumatic cylinder, which can be implemented as a double-acting cylinder including a first working chamber and a second working chamber. The two working chambers are fluidically separated from one another by a piston. The movement of the piston is coupled to that of the centering body, and the piston is rigidly connected, for example. It is preferred when at least one of the two working chambers at a time is fluidically connected to the surrounding atmosphere. So as to move the centering body in the direction of the insertion point, pressure is applied to the first working chamber, for example.

Instead of a pneumatic cylinder, another fluidic cylinder could also be used. The use of compressed air has the advantage that the compressed air can be given off into the surrounding atmosphere. It is not necessary here to form a closed circuit.

Preferably, the first working chamber can be fluidically connected to the surrounding atmosphere and thus be depressurized after the centering body has reached the insertion point and is in contact with the outer ring. In particular, the pressure reduction of the first working chamber takes place before the pusher brings the circular blank ring in contact with the outer ring and/or the centering body. This early pressure reduction of the first working chamber has the advantage that the centering body can subsequently be moved very quickly back into the starting position thereof by applying pressure to the second working chamber.

In the case of such a pneumatic cylinder, pressure can be applied to the second working chamber so as to move the centering body away from the insertion point and/or so as to hold the centering body in an upper position located away from the insertion point. The first working chamber is fluidically connected to the surrounding atmosphere.

For the purpose of the pressure application to and/or pressure reduction of the working chambers, in one exemplary embodiment the centering drive can comprise two valves that can be activated independently of one another. In this way, the pressure application to and/or pressure reduction of the two working chambers can be controlled independently of one another, and it is also possible for the pressure in both working chambers to be reduced simultaneously. Due to the valves being activatable independently of one another, fast switching is possible.

In a preferred embodiment, the insertion device includes a first transport unit, which is configured to transport the circular blank rings into a starting position adjacent to the pusher surface.

Moreover, it may be advantageous when a second transport unit is present, by way of which the outer rings can be transported to the insertion point.

The first transport unit can preferably comprise a first dial feed plate, which can be driven about a dial axis and comprises multiple receiving pockets for a respective circular blank ring. In addition or as an alternative, the second transport unit can comprise a second dial feed plate, which can be driven about a second dial axis and comprises multiple receiving pockets for a respective outer ring. The two rotational axes are preferably aligned parallel to one another and/or parallel to the axis. Along the axis, the two dial feed plates overlap. This allows the circular blank ring from the receiving pocket of the first dial feed plate to be inserted along the axis into the outer ring, which is located in a receiving pocket of the second dial feed plate.

Preferably, the outer ring does not carry out an axial movement during the introduction or insertion of the circular blank ring, or the axial movement is limited to an existing clearance. During the introduction or insertion of the circular blank ring, the outer ring remains in the receiving pocket of the second dial feed plate, for example.

The pusher drive is preferably designed as an electric-motor-based drive system. This is a linear drive, for example.

It is furthermore preferred when a centering channel is present coaxially with respect to the axis between a circular blank ring, which is located in a starting position prior to the insertion, and the insertion point. The centering channel can be delimited by a centering sleeve, for example. The centering channel preferably widens in the direction away from the insertion point and can have a conical design in a widening section. By way of the pusher, the circular blank ring is moved by the centering channel to the insertion point and aligned coaxially with respect to the axis.

A method for inserting a circular blank ring into an outer ring of a circular blank is carried out as follows:

First, an outer ring is transported to an insertion point. A circular blank ring is brought into a starting position at the same time that the outer ring is transported to the insertion point. In the starting position, the circular blank ring is arranged in the axial direction, parallel to the axis, at a distance from the outer ring and, in the starting position, is located between the outer ring and the pusher, for example. Thereafter, the outer ring is aligned coaxially with respect to the axis, using the centering body for example. Then, the circular blank ring is inserted into the hole of the outer ring. The axial movement of the circular blank ring and the alignment of the outer ring coaxially with respect to the axis can overlap chronologically. It is preferred if the alignment of the outer ring coaxially with respect to the axis has ended before the circular blank ring makes contact with the outer ring. It is furthermore advantageous if the circular blank ring, during and through the movement thereof in the axial direction out of the starting position thereof to the insertion point, is aligned coaxially with respect to the axis. In this way, prior coaxial alignment of the circular blank ring with respect to the axis can be dispensed with. Furthermore, it is avoided that the axial movement of the circular blank ring causes a radial shift with respect to the axis.

BRIEF DESCRIPTION OF THE DRAWINGS

Advantageous embodiments of the invention will be apparent from the dependent claims, the description and the drawings. Preferred exemplary embodiments will be described in greater detail hereafter based on the accompanying drawings. In the drawings:

DETAILED DESCRIPTION

Figure 1:
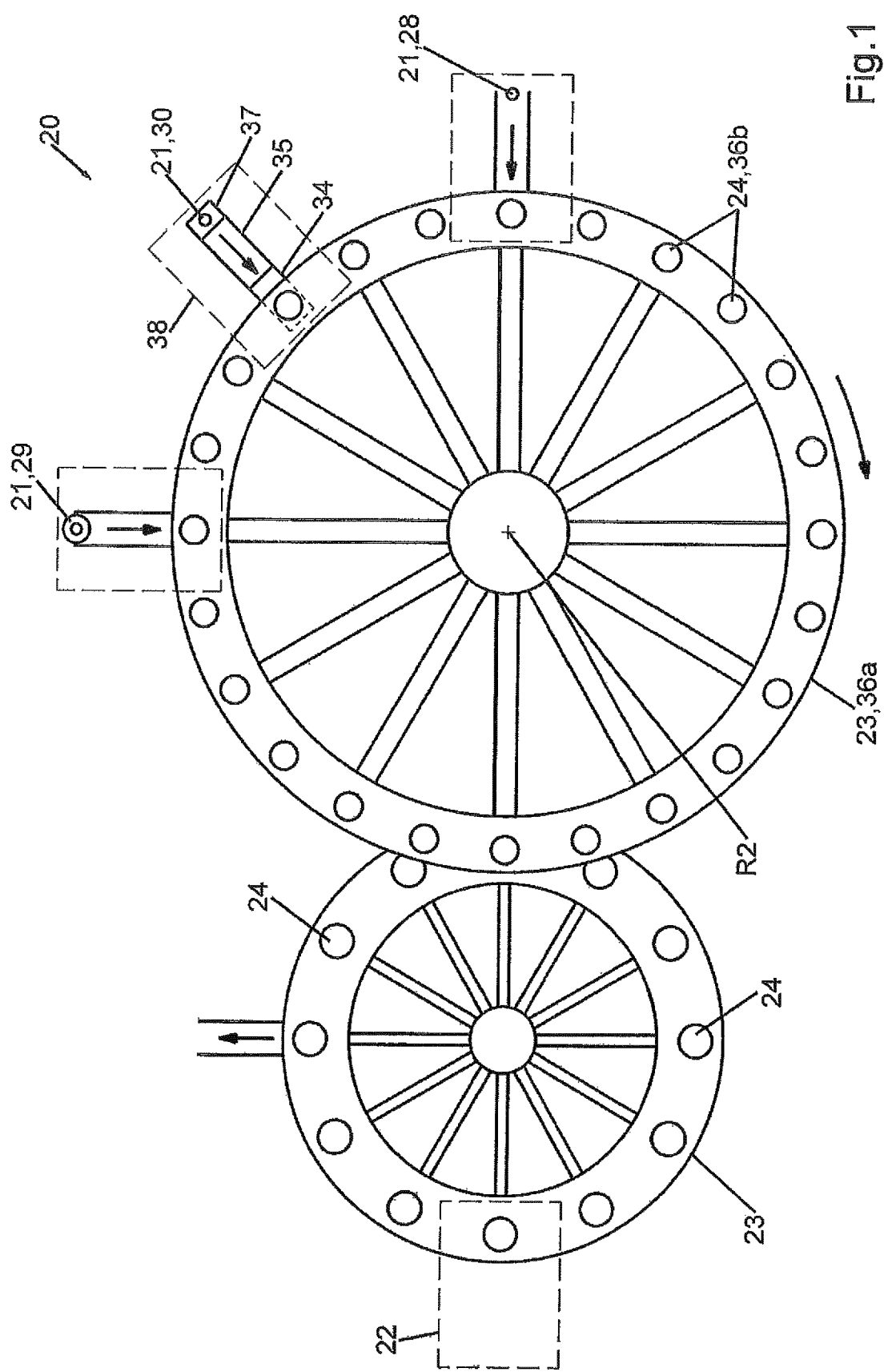
FIG. 1 shows a transport device for transporting circular blank parts or circular blanks to a stamping station.

FIG. 1 shows a highly schematic illustration of a transport device 20 used to transport a circular blank or to transport circular blank parts 21 to a stamping station 22. The transport device 20 can comprise one or more dial feed plates 23, which each include multiple pockets 24 on the circumferential regions thereof. A circular blank composed of multiple circular blank parts 21 or at least one of the circular blank parts 21 can be present in a pocket 24 and transported when the particular dial feed plate rotates about the dial axis thereof.

Figure 7:
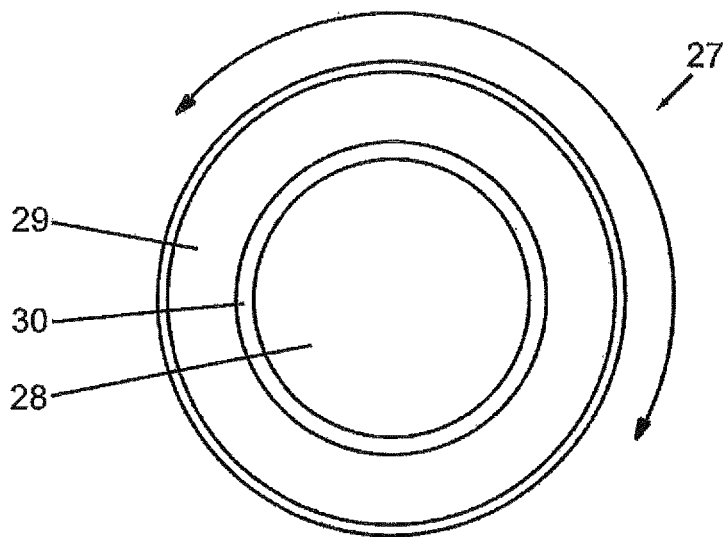
FIG. 7 shows a top view onto a coin stamped from the circular blank parts according to FIG. 6.

In the exemplary embodiment, a multi-piece circular blank is provided, from which a coin 27 (FIGS. 7 and 8) is stamped in the stamping station 22. In the exemplary embodiment, the coin 27 or the circular blank is composed of three different circular blank parts 21: a circular blank core 28, an outer ring 29, and a circular blank ring 30. The circular blank ring 30 is arranged between the circular blank core 28 and the outer ring 29. The circular blank ring 30 has a circular inner and outer contour according to the example. Accordingly, the circular blank core 28 has a circular outer contour, and the outer ring 29 has a circular inner contour or a circular hole.

The circular blank core 28 and the outer ring 29 are made of the same metallic material or metallic alloy, or different metallic materials or metallic alloys.

The circular blank ring 30 is made at least substantially of plastic material. It has a low mass, which is at least considerably less than that of the circular blank core 28 and that of the outer ring 29. Moreover, it has a lower spring rigidity than a circular blank part 21 made of a metal or a metallic alloy. The circular blank ring 30 can develop a static charge during transport. These properties prevent the circular blank ring 30 made of plastic material to be moved and handled as readily during the production of the coin 27 as a metallic circular blank part 21.

Figure 8:
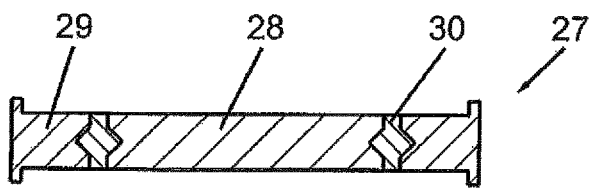
FIG. 8 shows the stamped coin from FIG. 7 in a cross-sectional view.

FIG. 1 shows a highly schematic illustration of one area of the dial feed plate 23 of an insertion device 34. The insertion device 34 is used to introduce or insert circular blank rings 30 into a respective assigned outer ring 29. The connection between the outer ring 29 and the circular blank ring 30 after the insertion into the insertion device 34 is a substantially force-fit connection. The connection between the circular blank ring 30 and the outer ring 29 or the circular blank core 28, which ultimately is a form-locked connection, is creating during the stamping process of the coin 27 in the stamping station 22 (FIG. 8).

Figure 2:
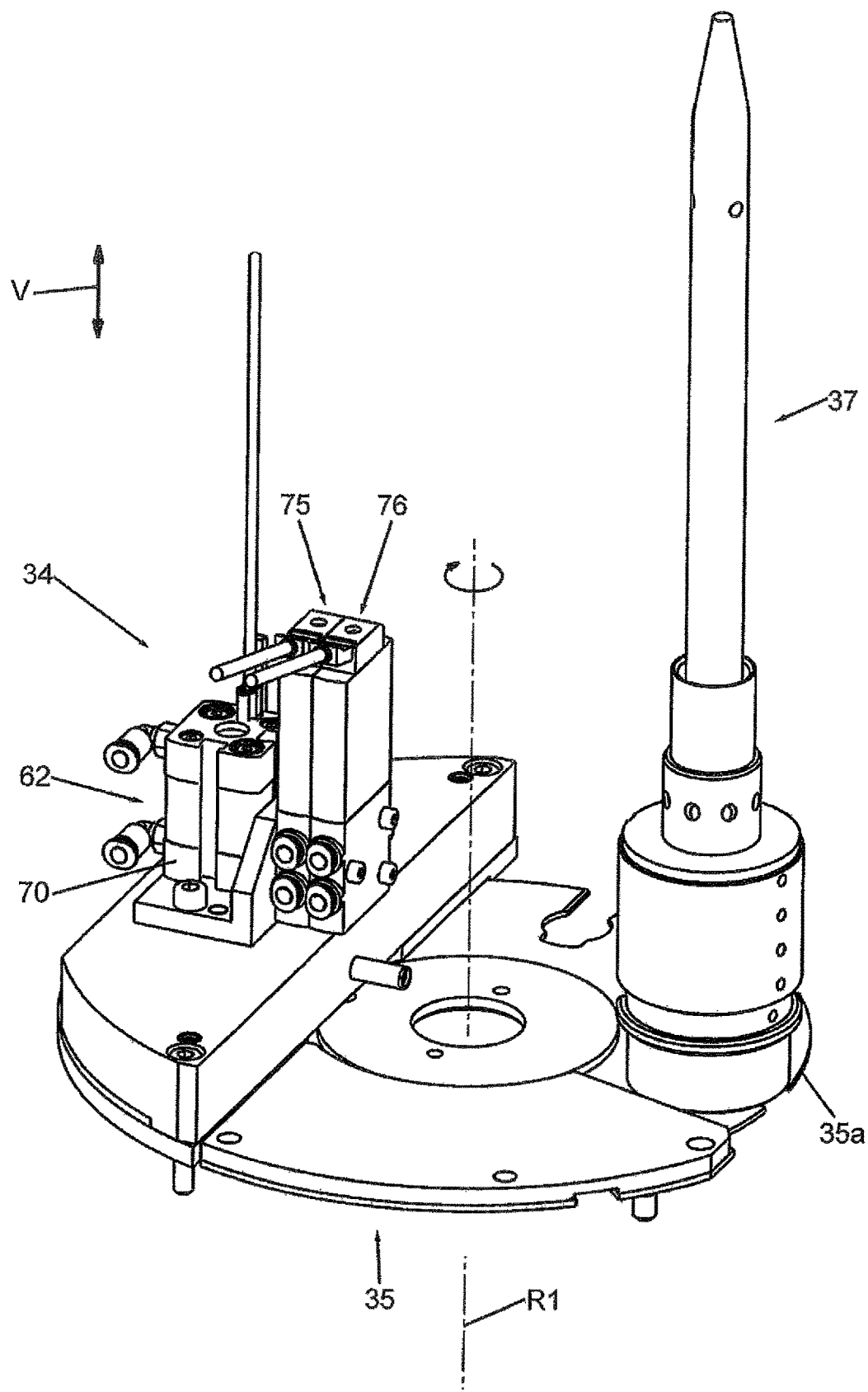
FIG. 2 shows a perspective partial illustration of one exemplary embodiment of an insertion device, which is connected to a storage buffer unit by way of a first transport unit.
Figure 3:
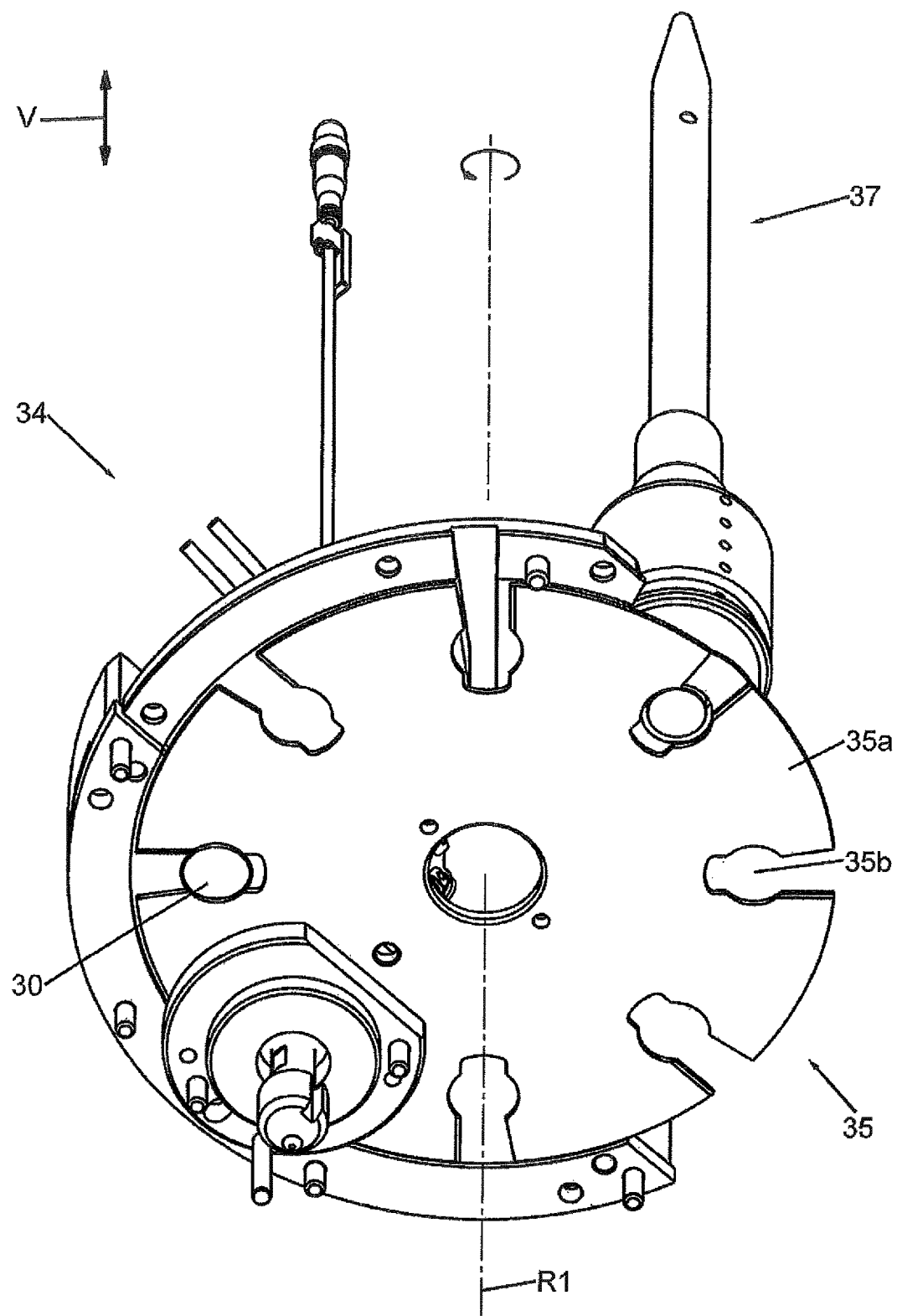
FIG. 3 shows the system from FIG. 2 in another perspective view from beneath.
Figure 4:
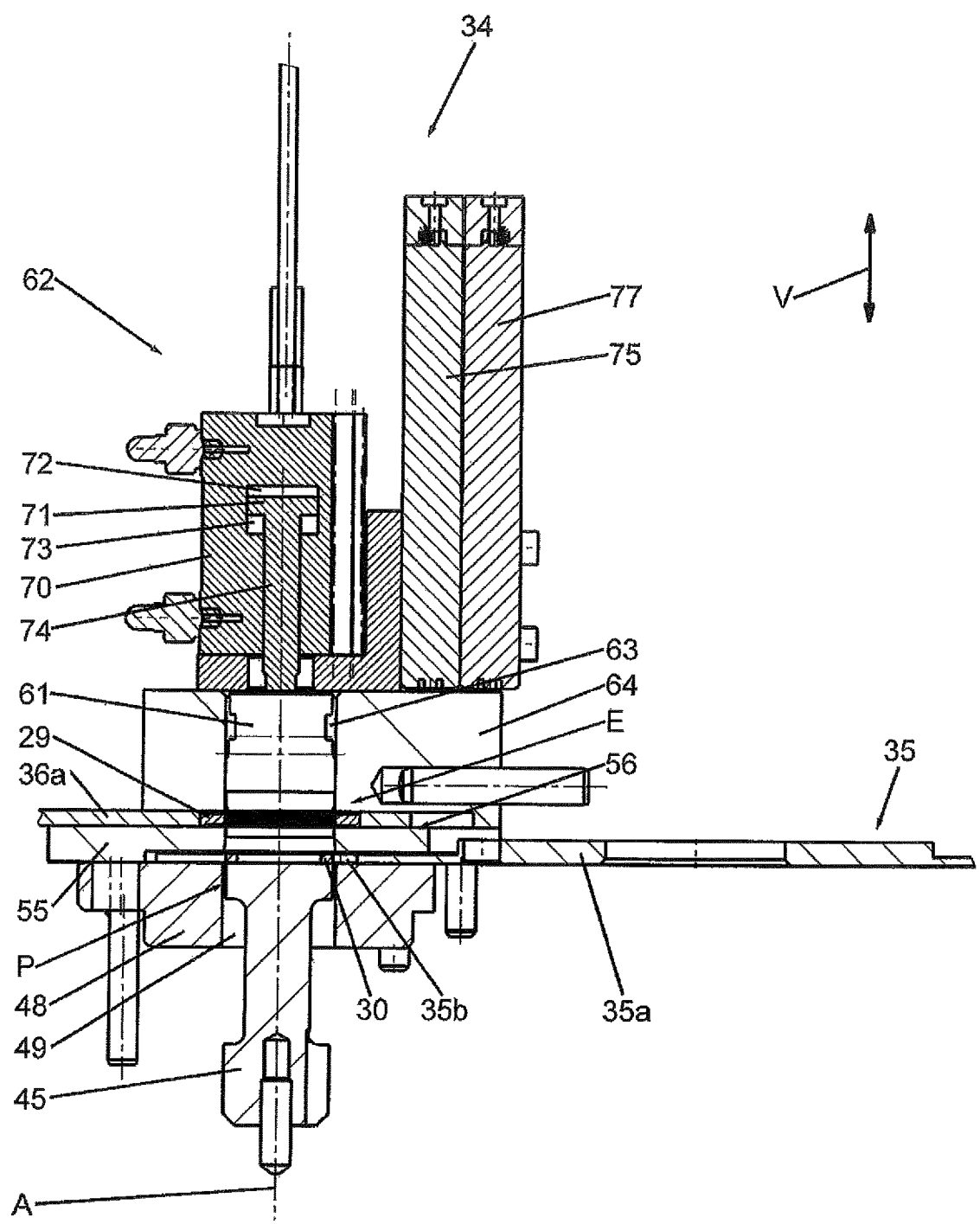
FIG. 4 shows a cross section through the insertion device from FIGS. 2 and 3.
Figure 5:
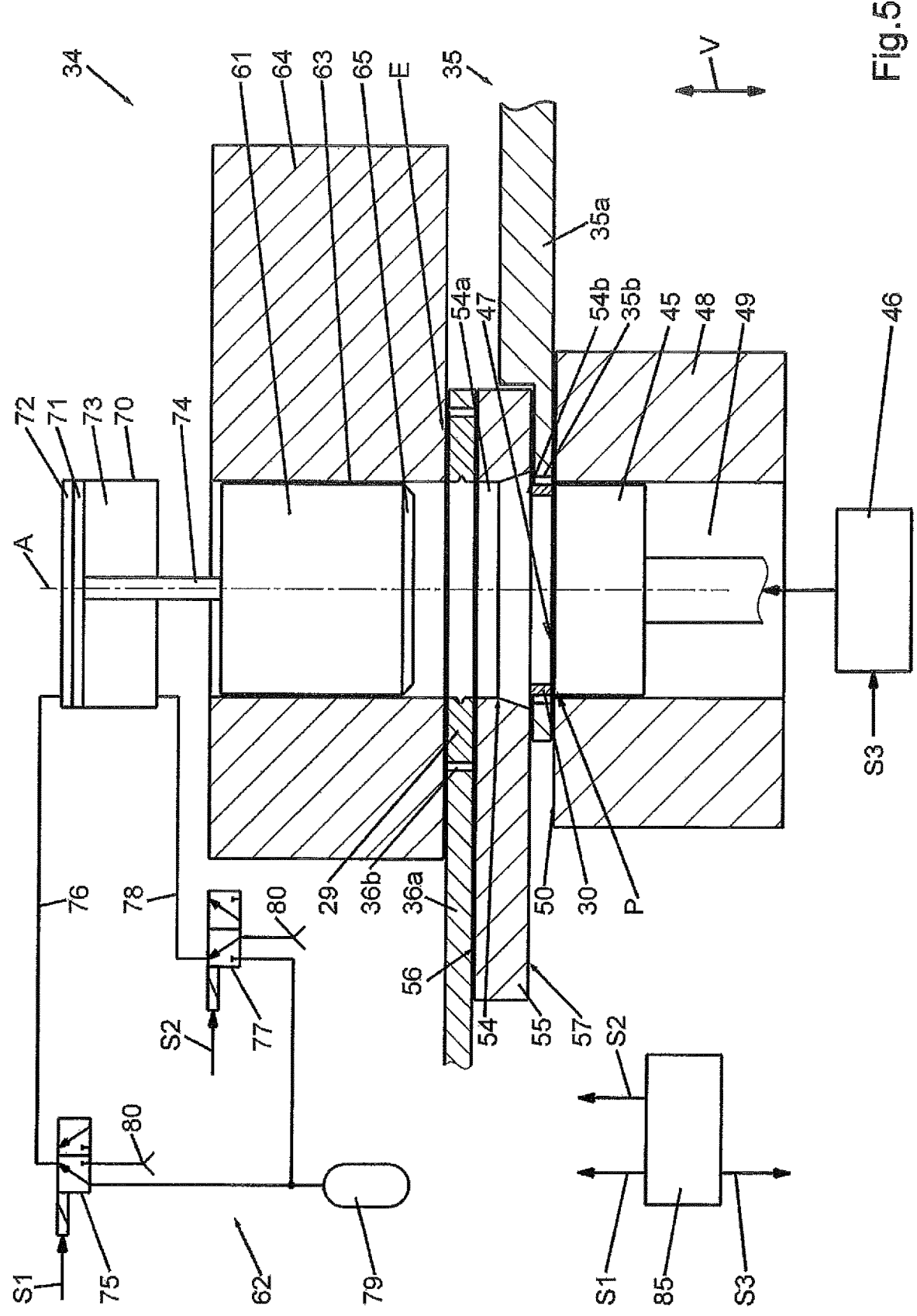
FIG. 5 shows a representative illustration of the exemplary embodiment of the insertion device according to FIGS. 2 to 4 in the manner of a block diagram.
Figure 6:
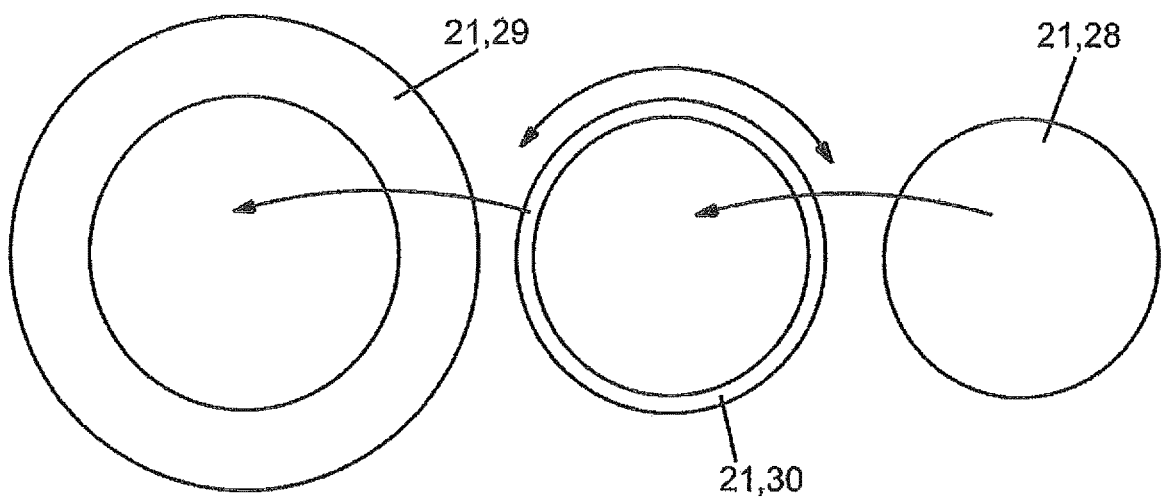
FIG. 6 shows circular blank parts for producing a multi-piece circular blank in a schematic top view.

FIGS. 2 to 5 show an exemplary embodiment of an insertion device 34. FIGS. 2 and 3 are perspective illustrations from above (FIG. 2) and from beneath (FIG. 3), while FIG. 4 shows a cross-sectional view through the insertion device 34 according to FIGS. 2 and 3. FIG. 5 shows the composition and the operating principle of the insertion device 34 according to FIGS. 2 to 4 in a representative illustration.

According to the example, the insertion device 34 is assigned to a first transport unit 35 and a second transport unit 36. The first transport unit 35 is configured to transport circular blank rings from a storage buffer unit 37 to the insertion device 34. For this purpose, the first transport unit 35 comprises a first dial feed plate 35a drivable about a first dial axis R1. The first dial feed plate 35a comprises receiving pockets 35b for receiving a respective circular blank ring 30, which are distributed at regular intervals along a circular line around the first dial axis R1. The first dial feed plate 35a can be moved by a respective predefined angle of rotation by way of an indexing movement. During each indexing movement, the next receiving pocket 35b comprising a circular blank ring 30 from the storage buffer unit 37 is moved into a starting position P in the insertion device 34 (FIGS. 4 and 5). After the insertion, the receiving pocket 35b of the first dial feed plate 35a is empty and is advanced to the storage buffer unit 37 again so as to receive another circular blank ring 30. The size of the first dial feed plate 35a and the number of receiving pockets 35b can be selected in a manner that is adapted to the use and the size of the circular blank rings 30. In the exemplary embodiment, the storage buffer unit 37 and the insertion device 34 are located diametrically opposite the first dial axis R1.

The storage buffer unit 37, the first transport device 35 and the insertion device 34 form parts of an insertion station 38 (FIG. 1).

According to the example, at least one the present dial feed plates 23 of the transport device 20 forms a dial feed plate of the second transport unit 36, which is referred to as the second dial feed plate 36a here. The second dial feed plate 36a can be driven about a second dial axis R2 and comprises receiving pockets 36b that are distributed at regular intervals along a circle around the second dial axis R2. By way of an intermittent indexing movement about the second dial axis R2, an outer ring 29 can be transported in every indexing cycle to an insertion point E in the insertion device 34. In an axial direction V, which in the exemplary embodiment agrees with the vertical direction, the circular blank ring 30, which is located in the starting position P, and the outer ring 29, which is located at the insertion point E, are arranged adjacent to and at a distance from one another. According to the example, the first dial axis R1 and the second dial axis R2 are likewise aligned in the axial direction V. In a modification compared to the preferred exemplary embodiment, the axial direction V could also be aligned inclined at an acute angle with respect to the vertical.

The insertion device 34 comprises a pusher 45 arranged coaxially with respect to an axis A. The pusher 45 can be moved by way of a pusher drive 46 along the axis A toward the insertion point E and away from the insertion point E. In the retracted position, the pusher 45 is located in the axial direction V beneath the first dial feed plate 35a or beneath the circular blank ring 30 located in the starting position (FIGS. 4 and 5). An end-face pusher surface 47 faces the circular blank ring 30, which is arranged in the starting position P, or the insertion point E. The pusher surface 47 is arranged at the end face of the pusher 45.

In the preferred exemplary embodiment, the pusher drive 46 is designed as an electric-motor-based linear drive. It would also be possible to use rotative electric motors comprising a gearbox arranged between the pusher 45 and the electric motor, such as an eccentric gearbox or a knuckle joint gearbox.

The pusher 45 can be moved in a guided manner along the axis A. A pusher guide channel 49, which runs coaxially with respect to the axis A, is present for guidance, for example in a pusher guide body 48. The pusher 45 is guided slideably in the pusher guide channel 49.

When the pusher 45 is retracted, the pusher surface 47 can end approximately flush with an upper face 50 of the pusher guide body 48. The pusher 45 at least does not protrude over the upper face 50, so that a circular blank ring 30 moved in a receiving pocket 35b of the first dial feed plate 35a can slide without impairment along the upper face 50 of the pusher guide body 48 and be positioned in the starting position P thereof on the pusher surface 47.

A centering channel 54 is present coaxially with respect to the axis A between the insertion point E and the pusher 45, which is in the retracted position thereof. According to the example, the centering channel 54 extends through an intermediate element 55, which can have a plate-shaped design. The intermediate element 55 has an upper face 56, which serves as a support or sliding surface for the outer rings 29, which are being transported by way of the second dial feed plate 36a to the insertion point E. When an outer ring 29 is located at the insertion point E, the outer ring surrounds the centering channel 54 in an annular manner and rests on the upper face 56 of the intermediate element 55.

A cylindrical section 54a adjoins the opening of the centering channel 54 on the upper face 56 of the intermediate element 55. The inside diameter of the cylindrical section 54a corresponds to the outside diameter of the circular blank ring 30.

A conical section 54b adjoins the cylindrical section 54a. Proceeding from the cylindrical section 54a, the conical section 54b widens toward a lower face 57 of the intermediate element 55 located opposite the upper face 56.

Additionally, a centering body 61 is arranged coaxially with respect to the axis A. The centering body 61 can be moved along the axis A in the axial direction V by way of a centering drive 62. The centering body 61 is arranged in a centering channel 63 of a guide element 64 and is open toward the insertion point E. On a free end facing the insertion point E, the centering body 61 comprises a conical end section or a chamfer 65 so as to taper toward the insertion point E in the end section adjoining the free end. The outside diameter of a cylindrical portion of the centering body 61 that adjoins the chamfer 65 is larger than the inside diameter of the outer ring 29. The free end of the centering body 61 or of the chamfer 65 facing the insertion point E has an outside diameter that is smaller than the inside diameter of the outer ring 29. When the centering body 61 engages in the outer ring 29, the centering body rests against an inner edge of the outer ring 29 in the region of the chamfer 65. The outer ring 29 is thus aligned coaxially with respect to the centering body 61, and consequently coaxially with respect to the axis A.

An exemplary embodiment of a centering drive 62 is schematically illustrated in FIGS. 4 and 5. The centering drive 62 comprises a pneumatic cylinder 70 including a piston 71 that can be moved in the axial direction V. The piston 71 fluidically separates a first working chamber 72 and a second working chamber 73 of the pneumatic cylinder 70 from one another. The movement of the piston 71 is coupled via a piston rod 74 to that of the centering body 71 and, according to the example, the piston is rigidly connected.

The centering drive 62 furthermore includes a first valve 75, which on the outlet side is fluidically connected to the first working chamber 72 by way of a first connecting line 76. A second valve 77 is fluidically connected on the outlet side to the second working chamber 73 by way of a second connecting line 78. The two valves 75, 76 are connected on the inlet side both to a pressure source 79 and to a venting connection 80. Either the pressure source 79 or the venting connection 80 can be fluidically connected to the assigned working chamber 72, 73 by way of each valve 75, 77.

The first valve 75 can be activated by way of a first control signal S1 and, according to the example, can be switched between two switch positions. Analogously, the second valve 77 can be activated by way of a second control signal S2 and, according to the example, can be switched between two switch positions.

The first control signal S1 and the second control signal S2 are generated by a control unit 85 and transmitted to the valves 75, 77. The control unit 85 moreover generates a third control signal S3 for the pusher drive 46. The control unit 85 is thus configured to control the pusher drive 46 and the centering drive 62. The control unit 85 can also fulfill other control tasks, for example control the first transport unit 35 and/or the second transport unit 36 to transport the circular blank rings 30 or the outer rings 29.

The above-described insertion device 34 operates as follows:

A circular blank ring 30 is transported to the insertion device 34 by way of the first transport unit 35 and arranged there in the starting position P thereof on the pusher surface 47 of the pusher 45. At the same time, an outer ring 29 is transported to the insertion point E in the insertion device 34 by way of the second transport unit 36. In this situation, neither the outer ring 29 nor the circular blank ring 30 are arranged exactly coaxially with respect to the axis A. If the two parts 29, 30 were moved without prior alignment in the axial direction V with respect to one another, the circular blank ring 30 made of plastic material could be damaged. After the hole has been punched out, the outer ring 29 has a burr on one of the two sides. It is not known whether the burr is present on the side from which the circular blank ring 30 is introduced, or on the opposite side. A circular blank ring 30 made of plastic material can be damaged in particular by this burr during insertion.

According to the invention, the outer ring 29 is therefore first aligned exactly coaxially with respect to the axis A. For this purpose, the centering body 61 is moved to the insertion point E by way of the centering drive 62 and engages there in the hole of the outer ring 29. It thus rests with the chamfer 65 or the conical section on the centering body 61. The outer ring 29 is thereby positioned coaxially with respect to the centering body 61, and consequently coaxially with respect to the axis A.

The pusher 45 is driven by way of the pusher drive 46 and moves the circular blank ring 30 through the centering channel 54 to the insertion point E. The circular blank ring 30 initially reaches the conical section 54b and, during the further movement thereof, is gradually aligned coaxially with respect to the axis A. As soon as the circular blank ring 30 has arrived at the cylindrical section 54a of the centering channel 54, it has reached a coaxial alignment with respect to the axis A. The circular blank ring is advanced by way of the pusher 45 until it is inserted into the outer ring 29, which was previously aligned coaxially with respect to the axis A, at the insertion point E.

The control unit 85 controls the pusher driver 46 and the centering drive 62 in a coordinated manner. The outer ring 29 is aligned coaxially with respect to the axis A by way of the centering body 61 before the pusher 45 has moved the circular blank ring 30 so far that the circular blank ring 30 and the outer ring 29 make contact with one another. This reliably prevents a radial overlap between the circular blank ring 30 and the outer ring 29 during the insertion of the circular blank ring 30.

The centering body 61 is moved to the insertion point E by pressurizing the first working chamber 72. For this purpose, the first connecting line 76 is connected to the pressure source 79 by way of the first valve 75. The second working chamber 73 is connected to the venting connection 80 by way of the second valve 77. This creates a fluidic connection between the second working chamber 73 and the surrounding atmosphere. The second working chamber 73 is thus open toward the surrounding area so that air can be displaced into the surrounding area for the movement of the piston 71.

As soon as the centering body 61 has reached the insertion point E and engaged with the outer ring 29, the first working chamber 72 in the exemplary embodiment is likewise connected to the venting connection 80, and accordingly to the surrounding atmosphere (vented), by way of the first valve 75. Thus, only the ambient atmospheric pressure is applied to the two working chambers 72, 73. The centering body 61 continues to rest against the outer ring 29 due to the weight thereof.

The movement of the centering body 61 away from the insertion point E takes place by applying pressure to the second working chamber 73. The second valve 77 is switched to the appropriate switch position. The retraction movement of the centering body 61 away from the insertion point E can take place either before the circular blank ring 30 makes contact with the outer ring 29, or while the circular blank ring 30 is being moved into the hole of the outer ring 29, or after the circular blank ring 30 has been completely inserted into the outer ring 29.

In the exemplary embodiment, the venting of the first working chamber 72 already takes place when the centering body 61 has reached the insertion point E, and more particularly independently of whether pressure is applied to the second working chamber 73 at the same time or later, so as to initiate the retraction movement of the centering body 61 away from the insertion point E.

The pusher 45 is position-controlled or position-regulated. As soon as the circular blank ring 30 has been completely inserted into the outer ring 29, the pusher 45 is moved back into the retracted starting situation (shown in FIG. 5) by way of the pusher drive 46. In this retracted position, a new circular blank ring 30 can be transported to the insertion device 34. Since the pusher 45 passes through the receiving pocket 35b of the first dial feed plate 35a during the movement thereof in the axial direction V, transport by way of the first dial feed plate 35a is only possible after the pusher 45 has again been completely removed from the receiving pocket 35b.

During the insertion of the circular blank ring 30 into the outer ring 29, the outer ring 29 is not moved in the axial direction V parallel to the axis A.

The invention relates to an insertion device 34 and to a method for inserting a circular blank ring 30 into an outer ring 29. For this purpose, an outer ring 29 is first transported to an insertion point E in the feed device 34. At the same time, a circular blank ring 30 is brought into a starting position P in the feed device. The circular blank ring 29 is first aligned coaxially with respect to an axis A by way of a centering body 61 arranged coaxially with respect to the axis A. It moves solely radially with respect to the axis A. Thereafter, the circular blank ring 30 is inserted into the hole of the outer ring 29 by way of a pusher 45. During this movement of the circular blank ring 30 from the starting position P thereof into the outer ring 29, the circular blank ring can be aligned coaxially with respect to the axis A by way of a centering means, and preferably by way of a centering channel 54. The centering body 61 can also be moved away from the insertion point E by the circular blank ring 30, for example into a starting position or an idle position, and is thereby disengaged from the outer ring 29. The circular blank ring 30 carries out a superimposed movement in the axial direction V and in the radial direction radially with respect to the axis A.

LIST OF REFERENCE NUMERALS 20 transport device
21 circular blank part
22 stamping station
23 dial feed plate
24 pocket
27 coin
28 circular blank core
29 outer ring
30 circular blank ring
34 insertion device
34 first transport unit
35a first dial feed plate
35b receiving pocket of the first dial feed plate
36 second transport unit
37 storage buffer unit
38 insertion station
45 pusher
46 pusher drive
47 pusher surface
48 pusher guide body
49 pusher guide channel
50 upper face of the pusher guide body
54 centering channel
54a cylindrical section of the centering channel
54b conical section of the centering channel
55 intermediate element
56 upper face of the intermediate element
57 lower face of the intermediate element
61 centering body
62 centering drive
63 centering channel
64 guide element
65 chamfer 70 pneumatic cylinder
71 piston
72 first working chamber
73 second working chamber
74 piston rod
75 first valve
76 first connecting line
77 second valve
78 second connecting line
79 pressure source
80 venting connection
85 control unit
A axis
E insertion point
P starting position
R1 first dial axis
R2 second dial axis
V axial direction

The invention claimed is:

1. An insertion device (34) for inserting a circular blank ring (30) into an outer ring (29) of a circular blank, the insertion device (34) comprising:
   a pusher (45), which is arranged coaxially with respect to an axis (A) and includes a pusher surface (47) configured to act upon the circular blank ring (30);
   a pusher drive (46) configured to move the pusher (45) along the axis (A);
   a centering body (61), which is arranged coaxially with respect to the axis (A) and has a free end that is assigned to the pusher surface (47);
   a centering drive (62) configured to move the centering body (62) along the axis (A);
   a controller (85) configured to generate control signals for activating the centering drive and the pusher drive,
   wherein the controller is configured to activate the centering drive (62) so as to cause the centering body (61) to engage with an outer ring (29) arranged at an insertion point (E), and thereby align the outer ring coaxially with respect to the axis (A),
   wherein the controller (85) is furthermore configured to activate the pusher drive (46) so as to move the circular blank ring (30) to the insertion point (E) as a result of being acted upon by the pusher surface (47), and to insert the circular blank ring (30) into the outer ring (29), which has been aligned coaxially with respect to the axis (A) by the centering body (61),
   wherein the controller (85) is furthermore configured to activate the centering drive (62) and the pusher drive (46) in such a chronologically coordinated manner that the centering body (61) engages in the outer ring (29) before the pusher (45) brings the circular blank ring (30) in contact with the outer ring (29).

2. The insertion device according to claim 1, wherein the controller (85) is configured to activate the centering drive (62) and the pusher drive (46) in such a chronologically coordinated manner that the centering body (61) rests against the outer ring (29) during insertion of the circular blank ring (30) into the outer ring (29).

3. The insertion device according to claim 1, wherein the controller (85) is configured to activate the centering drive (62) and the pusher drive (46) in such a chronologically coordinated manner that the centering body (61) acts upon the outer ring (29) until the circular blank ring (30) moved by the pusher (45) pushes the centering body (61) away from the outer ring (29).

4. The insertion device according to claim 1, wherein the centering drive (62) comprises a pneumatic cylinder (70) including a first working chamber (72) and a second working chamber (73), and configured such that pressure being applied to the first working chamber (72) moves the centering body (61) to the insertion point (E).

5. The insertion device according to claim 4, wherein the controller (85) is configured to activate the centering drive (62) such that the first working chamber (72) is fluidically connected to surrounding atmosphere before the pusher (45) brings the circular blank ring (29) in contact with the outer ring (29) and/or the centering body (61).

6. The insertion device according to claim 4, wherein the centering drive (62) is further configured such that pressure applied to the second working chamber (73) causes the centering body (61) to move away from the insertion point (E) and/or causes the centering body (61) to be held in an upper position located away from the insertion point (E).

7. The insertion device according to claim 4, wherein the centering drive (62) comprises two valves (75, 77) that are configured to be activated independently of one another.

8. The insertion device according to claim 1, further comprising a first transport unit (35) configured to transport the circular blank rings (30) into a starting position (P) adjacent to the pusher surface (47).

9. The insertion device according to claim 1, further comprising a transport unit (36) configured to transport the outer rings (29) to the insertion point (E).

10. The insertion device according to claim 8, wherein the first transport unit (35) comprises a first dial feed plate (35a) drivable about a first dial axis (R1), which comprises a plurality of receiving pockets (35b) for a respective circular blank ring (30).

11. The insertion device according to claim 9, wherein the transport unit (36) comprises a dial feed plate (36a) drivable about a second dial axis (R2), which comprises a plurality of receiving pockets (36b) for a respective outer ring (29) or a unit comprising an outer ring (29) and an inserted circular blank ring (30).

12. The insertion device according to claim 1, wherein the pusher drive (46) is an electric-motor drive system.

13. The insertion device according to claim 1, wherein a centering channel (54) is present coaxially with respect to the axis (A) between the pusher (45), which is in a retracted position thereof, and the insertion point (E).

14. A method for inserting a circular blank ring (30) into an outer ring (29) of a circular blank using the insertion device of claim 1, the method comprising:
   transporting the outer ring (29) to the insertion point (E);
   transporting the circular blank ring (30) into a starting position (P) in the axial direction, parallel to an axis (A), adjacent to the outer ring (29);
   aligning the outer ring (29) coaxially with respect to the axis (A); and
   moving the circular blank ring (30) in the axial direction into the outer ring (29) at the insertion point (E).

15. The method according to claim 14, further comprising aligning the circular blank ring (30) coaxially with respect to the axis (A) during the moving the circular blank ring (30) in the axial direction to the insertion point (E).

16. The insertion device according to claim 11, wherein the outer ring (29) remains in the receiving pocket (36b) of the dial feed plate (36) during the insertion of the circular blank ring (30).

* * * * *